No. 860,168. PATENTED JULY 16, 1907.
C. H. WARREN.
NUT LOCK.
APPLICATION FILED JULY 6, 1906.
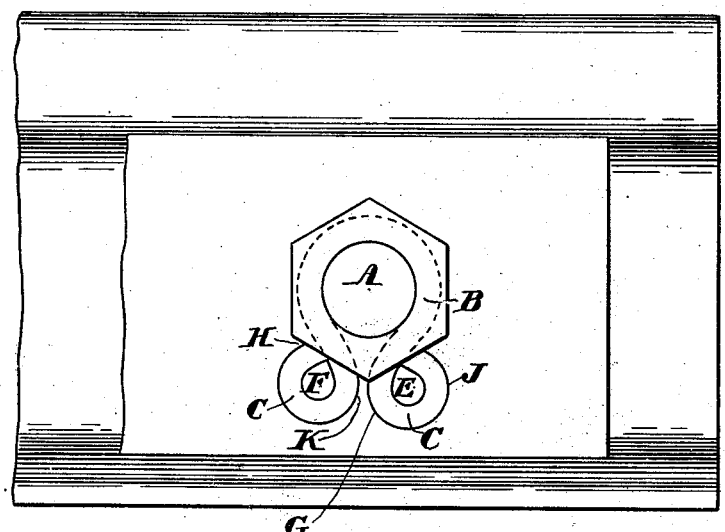
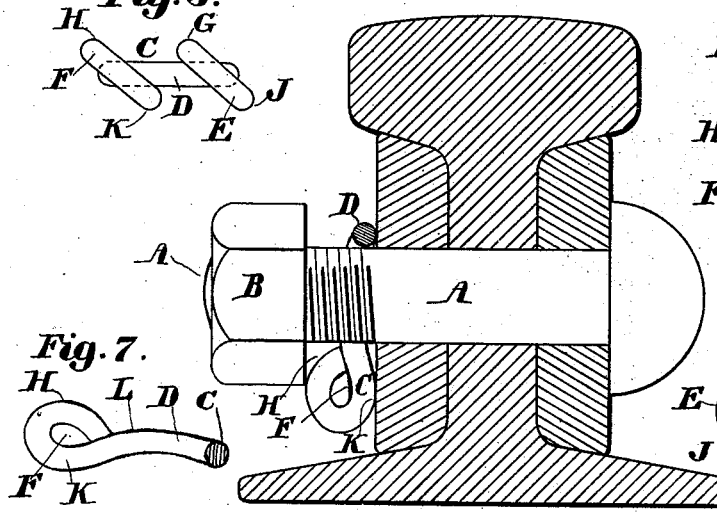
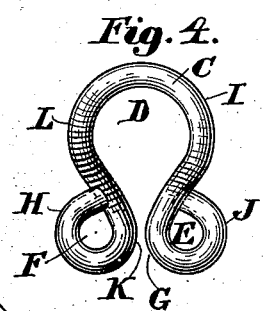
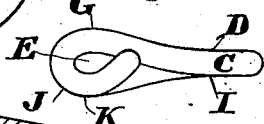
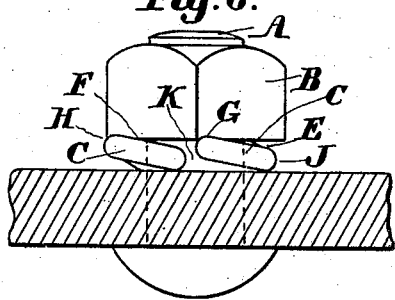
Witnesses:
Walter E. Lombard
Nathan C. Lombard
Inventor:
Charles H. Warren

UNITED STATES PATENT OFFICE.

CHARLES H. WARREN, OF BOSTON, MASSACHUSETTS.

NUT-LOCK.

No. 860,168.  Specification of Letters Patent.  Patented July 16, 1907.

Application filed July 6, 1906. Serial No. 325,023.

*To all whom it may concern:*

Be it known that I, CHARLES H. WARREN, of Boston, in the county of Suffolk and State of Massachusetts, have invented certain new and useful Improvements in Nut-Locks, of which the following is a specification.

This invention relates to nut-locks.

The object is to produce a nut-lock which shall be of such construction that the nut will be at all times held firmly in position on the bolt, against any loosening or falling off from vibration incident to the passage of trains over the track, or jar from any machinery on which it may be used; furthermore, to produce a nut-lock which shall be simple of construction, effective and durable in use, and comparatively inexpensive of production.

With these objects in view, the invention consists in a triple spring nut-lock, made of steel, iron or other material, but preferably steel,—the same round, square or other shape, formed into three loops, each loop a spring in itself, a main loop larger than the other two, of pear shape, and also of sufficient diameter at its widest part to easily encircle the bolt, the two smaller loops, preferably round, each of about one-half of the diameter of the main loop at its widest part, made by first bending the ends of the larger loop outward in a circle, one to the right and the other to the left of the main loop, and on a plane with the same, then twisting each small loop at its base so that each will stand on an angle of about 45 degrees to the plane of the main loop, for the purpose of holding up the ends of the main loop, also forming spring wedges between the nut and bar, plate or other substance through which the bolt passes, affording much additional spring resistance, providing a positive obstruction against the nut corners, preventing the same from turning backward or jarring loose, and holding at the same time firmly against the rail, bar or plate, preventing the turning off of the nut and nut-lock together, after the nut has been turned home upon the bolt, in addition to the frictional force exerted by the combined pressure of the three spring loops. The small loops in their respective positions extend out, beyond and above the under side of the nut corners and lower edge from one-third to one-half of their diameter, according to the kind of nut used, and are therefore only partly confined and compressed when the nut-lock is applied and the nut turned home, affording much additional spring resistance, greatly assisting in preserving the resiliency of the main loop encircling the bolt (that is nearly compressed), relieving the same of part of the strain under pressure, by equalizing the force, and producing a most durable and efficient spring nut-lock; furthermore, in the various novel details of construction, whereby its objects are attained.

In the accompanying drawings, forming part of these specifications, and in which, like letters of reference, indicate corresponding parts. Figure I is a front elevation of a portion of a rail-joint, showing my new, improved nut-lock applied to the bolt, and the nut turned down upon the same. Fig. II is a cross sectional view of a rail joint, showing the bolt with my new improved nut-lock applied before the nut is turned home. Fig. III is an end view of my nut-lock, showing the angular position of the small loops, relative to the main loop that encircles the bolt, illustrating their resilient qualities when subjected to pressure, and that the device is reversible in operation. Fig. IV. is a front view of my nut-lock, exhibiting from another point of view the general outline or shape and the comparative size of the three loops. Fig. V. is a perspective view of my nut-lock, showing how the small loop on the right hand side (as shown in Fig. IV), by being tipped at an angle of about 45 degrees to the plane of the main loop, forms an inclined plane over which the nut must slide, when being applied or removed and how, when the edge of the nut has passed, it springs up behind, preventing the turning back of the nut. Fig. VI. is an end view of my nut-lock, showing the relative positions of the small loops when compressed between the nut and rail-bar or plate and performing the previously described functions. Fig. VII is another perspective view of my nut-lock, from the left hand side, showing the position of the main loop offering resistance to the turning back of the nut and the position of the small loop, as before mentioned.

Referring to the drawings: "A" designates the bolt, which is of ordinary construction, and it is to be inserted through the rail, bar or other object in which it is to be applied.

"B" designates the nut to be screwed on the threaded end of the bolt, and is also of the ordinary construction, and of any desired size and shape.

"C" designates the nut-lock made of round, square or other form of steel, iron or other material, so as to have the requisite strength and spring.

"D" designates the main loop, that encircles the bolt, pear-shaped and partly helical in form, and of sufficient diameter to slip easily over the same when applying.

"E" designates the right small loop formed by bending one of the large loops outward in an opposite direction, but on the same plane with the main loop, describing a circle, then turned at its base so that the small loop will stand at an angle of about 45 degrees to the plane of the main loop, as shown in Fig. III, thereby forming a positive obstruction against the nut's turning backward when screwed home upon the bolt, and supporting the main loop in maintaining its shape and resiliency.

"F" designates the left small loop, made the same as "E", only that it occupies a reversed or opposite position to it, thereby providing a reversible nut-lock that must be properly applied by unskilled hands.

"G" designates the high point in the loop "E" that rises in the path that is traversed by the under side of the nut, as shown in Figs. III, V and VI, obstructing the corner of the same, locking it securely from turning backward incident to jar or vibration, expansion or contraction of metals.

"H" designates the locking point on loop "F", that rises and also engages the corner of the nut as shown in Figs. III, VI and VII, forming a second positive obstruction against the nut corners, and also in the event that the other small loop should be rendered unfit to serve the purpose intended, the nut would still remain locked in position on the bolt. "I", "J" and "K" designate the portions of the nut-lock that rest upon the rail, bar or plate when applying the device.

In operation the nut-lock is first placed on the threaded end of the bolt, either side downward against the rail, bar or plate through which the bolt has been inserted, the portions of the nut-lock at the portion "I" of the large loop, and "J" of the small loop "E", and "K" of loop "F", all resting on the rail, bar or plate, as shown in Figs. IV and V. As the nut is turned downward on the bolt, the first point of contact with the nut-lock is at "G" and "H" of the small loops "E" and "F" at the top, and "J" and "K" at the bottom, with the rail, bar or plate, acting as spring wedges between the nut and rail, bar or plate, because of the angular position they occupy relative to the plane of the main loop, and as the pressure is increased by turning down of the nut on the bolt, the portions "J" and "K" hold the nut-lock from turning on the same. The portions "G" and "H" serve as locking points against the nut, springing up in the track traversed by the corners of the nut after the same have passed over them, striking against the same, and holding the nut securely in position against jar or vibration or loosening from expansion or contraction.

The small loops "E" and "F" extend out and beyond the radius of any style of nut that is commonly used, a distance of one-third to one-half of their diameter, therefore being less confined than the main loop "C", thereby assisting the same to a great extent in preserving its shape and resiliency, also its durability in use, lasting much longer because of their freedom from being wholly confined under the nut, and never, therefore, fully compressed under any conditions.

The large loop "D", of concave form, on the right side in Fig. IV, and of bow shape or convex on the opposite side, the highest point of the former at "G" in Fig. V, and of the latter at "H" in Figs. IV and VII, and the next highest point of same at "L" in Fig. VII, which is the next point to come in contact with the nut after the same first strikes the portions "G" and "H" of the small loops "E" and "F". The pressure of the nut on this portion "L" meets with great resistance because of the strength of its bow shape at that portion of the loop "D", and as the same is forced down the entire loop, changes in form, rising up at its portion "I" in Fig. IV against the nut, causing a uniform resistance throughout the entire loop, therefore less liable to break or become set, or lose its elasticity as the nut is turned down, increasing its force of resistance under compressure, in addition to the resistance of the loops "E" and "F", affording a triple spring combination nut-lock of great strength and resiliency, durability and efficiency, a positive nut-lock under all conditions,—reversible, automatic, and most simple to apply or remove.

It will thus be seen from the foregoing description taken in connection with the drawings, that the nut-lock having been placed on the bolt, and the nut screwed home, that the main loop will be nearly compressed, and the two small loops partly compressed, that the small loops engage the corners of the nut, preventing the same from jarring loose or turning backward on the bolt, and that their lower edges resting on the rail, bar or plate also prevent the nut-lock from turning backward or working loose because of their angular position to the plane of the main loop, acting as spring wedges between the under side of the nut and the rail, bar or plate, affording great spring resistance against the under side of the nut in addition to the spring pressure of the main loop encircling the bolt. It will therefore be seen that the device prevents the nut from jarring loose upon the bolt or turning backward on the same, or both the nut and nut-lock from working loose, also that the device takes up all slack caused by wear from vibration, or expansion and contraction of metals. The combination of three spring loops of new and novel shaping providing a nut-lock of extreme resiliency and durability, most effective in operation, reversible and simple to apply or remove, therefore a most practical device in the hands of unskilled workmen.

Having thus fully described my invention, what I claim as new and desire to secure by Letters Patent is:

1. In a nut-lock, a member having three continuous spring loops, a main helical loop, pear shaped, that encircles the bolt at its widest portion, two small loops formed by bending the ends of the main loop outward, describing circles in opposite directions, one to the right, the other to the left, beginning on a plane with the main loop, both small loops of the same diameter and about one-half of the diameter of the main loop, substantially as shown and described.

2. In a nut-lock, a member having three continuous spring loops, a large loop and two smaller loops, each small loop turned at its point of diversion from the main loop at an angle of about forty-five degrees to the plane of the main loop, substantially as shown and described.

In testimony whereof I have affixed my signature, in presence of two witnesses.

CHARLES H. WARREN.

Witnesses:
SARAH J. WARREN,
LILLIAN B. WARREN.